(12) United States Patent
Loa et al.

(10) Patent No.: US 9,294,453 B2
(45) Date of Patent: Mar. 22, 2016

(54) DIRECT MODE COMMUNICATION SYSTEM AND DISCOVERY INTERACTIVE METHOD THEREOF

(71) Applicant: Institute For Information Industry, Taipei (TW)

(72) Inventors: Kanchei Loa, Taipei (TW); Yi-Hsueh Tsai, New Taipei (TW); Yi-Ting Lin, New Taipei (TW)

(73) Assignee: Institute For Information Industry, Taipei (TW)

( * ) Notice: Subject to any disclaimer, the term of this patent is extended or adjusted under 35 U.S.C. 154(b) by 233 days.

(21) Appl. No.: 13/757,773

(22) Filed: Feb. 2, 2013

(65) Prior Publication Data
US 2013/0205369 A1 Aug. 8, 2013

Related U.S. Application Data

(60) Provisional application No. 61/595,133, filed on Feb. 5, 2012, provisional application No. 61/642,466, filed on May 4, 2012, provisional application No. 61/672,785, filed on Jul. 18, 2012, provisional application No. 61/721,020, filed on Oct. 31, 2012.

(51) Int. Cl.
*H04L 9/32* (2006.01)
*G06F 7/04* (2006.01)
(Continued)

(52) U.S. Cl.
CPC .............. *H04L 63/08* (2013.01); *G06F 21/35* (2013.01); *G06F 21/445* (2013.01);
(Continued)

(58) Field of Classification Search
CPC ... H04W 12/06; H04W 84/18; H04W 76/023; H04W 8/005; H04W 76/02; H04W 84/12; H04W 4/206; H04L 63/08; H04L 63/0823; H04L 63/0492; H04L 63/18; H04L 2209/80; H04L 63/0869; H04L 2209/56; H04L 2209/805; H04L 63/0853; H04L 2463/102; H04L 41/0806; H04L 61/2015; H04L 69/24; H04L 9/0841; H04L 9/0844; H04L 9/0861; H04L 9/3263; H04L 65/1073; H04L 9/3265; H04L 9/3271; H04L 9/3273; G06F 2221/2111; G06F 21/445; G06F 21/33; G06F 21/43; G06F 2221/2115; G06F 21/35; G06Q 20/3278; G06Q 20/3674; G06Q 20/02; G06Q 20/223; G06Q 20/38215; H01Q 21/29
USPC ........................................................... 726/3
See application file for complete search history.

(56) References Cited

U.S. PATENT DOCUMENTS 6,647,257 B2   11/2003   Owensby
6,766,160 B1 *  7/2004   Lemilainen et al. .......... 455/411
(Continued)

OTHER PUBLICATIONS

Balfanz, Dirk, et al. "Talking to Strangers: Authentication in Ad-Hoc Wireless Networks." NDSS. 2002.*
(Continued)

*Primary Examiner* — Michael Simitoski
(74) *Attorney, Agent, or Firm* — Skaar Ulbrich Macari, P.A.

(57) ABSTRACT

A direct-mode communication system having a user direct-mode communication apparatus and a serving direct-mode communication apparatus is provided. The user direct-mode communication apparatus connects to an operating server, and authenticates with the operating server to obtain a user authenticated identification. The serving direct-mode communication apparatus connects to the operating server, and authenticates with the operating server to obtain a serving authenticated identification. The user direct-mode communication apparatus broadcasts a discovery signal based on the user authenticated identification. The serving direct-mode communication apparatus receives the discovery signal after the user direct-mode communication apparatus enters a default serving range, and provides interactive information to the user direct-mode communication apparatus according to the discovery signal and based on the serving authenticated identification.

26 Claims, 12 Drawing Sheets

(51) Int. Cl.

| | | |
|---|---|---|
| *H04L 29/06* | (2006.01) | |
| *G06F 21/44* | (2013.01) | |
| *G06F 21/35* | (2013.01) | |
| *G06Q 20/32* | (2012.01) | |
| *H04W 8/00* | (2009.01) | |
| *H04W 12/06* | (2009.01) | |
| *H04W 84/18* | (2009.01) | |
| *H04W 84/12* | (2009.01) | |
| *H04L 12/28* | (2006.01) | |
| *H04W 76/02* | (2009.01) | |

(52) U.S. Cl.
CPC ....... *G06Q 20/3278* (2013.01); *H04L 63/0869* (2013.01); *H04W 8/005* (2013.01); *H04W 12/06* (2013.01); *H04W 84/12* (2013.01); *H04W 84/18* (2013.01); *H04W 76/023* (2013.01)

(56) References Cited

U.S. PATENT DOCUMENTS

| | | | |
|---|---|---|---|
| 6,775,770 B1 * | 8/2004 | Davis et al. | 713/156 |
| 6,886,095 B1 * | 4/2005 | Hind et al. | 713/168 |
| 6,904,055 B2 * | 6/2005 | Pichna et al. | 370/467 |
| 7,552,322 B2 * | 6/2009 | Balfanz et al. | 713/159 |
| 7,634,802 B2 * | 12/2009 | Chiloyan | 726/4 |
| 7,693,797 B2 * | 4/2010 | Ekberg | 705/67 |
| 7,882,238 B2 * | 2/2011 | Burns et al. | 709/227 |
| 7,917,748 B2 * | 3/2011 | Hengeveld et al. | 713/163 |
| 7,962,744 B2 * | 6/2011 | Yamamoto et al. | 713/155 |
| 8,271,786 B1 * | 9/2012 | Pradhan et al. | 713/169 |
| 8,522,019 B2 * | 8/2013 | Michaelis | 713/168 |
| 8,621,071 B1 * | 12/2013 | Scofield et al. | 709/224 |
| 2003/0149874 A1 * | 8/2003 | Balfanz et al. | 713/168 |
| 2003/0172144 A1 * | 9/2003 | Henry et al. | 709/223 |
| 2004/0014423 A1 * | 1/2004 | Croome et al. | 455/41.2 |
| 2004/0243846 A1 * | 12/2004 | Aboba et al. | 713/201 |
| 2005/0054327 A1 * | 3/2005 | Johnston | 455/411 |
| 2005/0188193 A1 * | 8/2005 | Kuehnel et al. | 713/155 |
| 2005/0233729 A1 * | 10/2005 | Stojanovski et al. | 455/411 |
| 2006/0130126 A1 * | 6/2006 | Touve et al. | 726/5 |
| 2006/0174116 A1 * | 8/2006 | Balfanz et al. | 713/168 |
| 2007/0186105 A1 * | 8/2007 | Bailey et al. | 713/168 |
| 2007/0198837 A1 * | 8/2007 | Koodli et al. | 713/171 |
| 2008/0065892 A1 * | 3/2008 | Bailey et al. | 713/171 |
| 2009/0068982 A1 * | 3/2009 | Chen et al. | 455/407 |
| 2010/0017597 A1 * | 1/2010 | Chandwani | 713/156 |
| 2010/0070758 A1 * | 3/2010 | Low et al. | 713/155 |
| 2010/0202345 A1 * | 8/2010 | Jing et al. | 370/328 |
| 2010/0312619 A1 | 12/2010 | Ala-Pietila et al. | |
| 2011/0026504 A1 * | 2/2011 | Feinberg | 370/338 |
| 2011/0034127 A1 * | 2/2011 | Wentink et al. | 455/41.2 |
| 2011/0082939 A1 * | 4/2011 | Montemurro et al. | 709/227 |
| 2011/0082940 A1 * | 4/2011 | Montemurro et al. | 709/227 |
| 2011/0292300 A1 * | 12/2011 | Nagara et al. | 348/734 |
| 2012/0011576 A1 * | 1/2012 | Guan et al. | 726/7 |
| 2012/0102207 A1 * | 4/2012 | Salowey et al. | 709/228 |
| 2012/0306622 A1 * | 12/2012 | Trinh et al. | 340/10.1 |
| 2012/0311038 A1 * | 12/2012 | Trinh et al. | 709/204 |
| 2012/0311328 A1 * | 12/2012 | Wang et al. | 713/168 |
| 2012/0319919 A1 * | 12/2012 | Kirovski et al. | 343/853 |
| 2012/0322413 A1 * | 12/2012 | Haddad et al. | 455/411 |
| 2013/0036231 A1 * | 2/2013 | Suummki | 709/228 |
| 2013/0065538 A1 * | 3/2013 | Kim | 455/68 |
| 2013/0081113 A1 * | 3/2013 | Cherian et al. | 726/4 |
| 2013/0227152 A1 * | 8/2013 | Lee et al. | 709/227 |
| 2013/0282903 A1 * | 10/2013 | DeLuca | 709/225 |
| 2013/0286889 A1 * | 10/2013 | Cherian et al. | 370/254 |
| 2014/0004796 A1 * | 1/2014 | Cakulev et al. | 455/41.2 |
| 2014/0301552 A1 * | 10/2014 | Yi et al. | 380/270 |

OTHER PUBLICATIONS

Bourimi, Mohamed, et al. "Enhancing usability of privacy-respecting authentication and authorization in mobile social settings by using Idemix:(in the context of the EU FP7 di. me Project)." (2011).*

Hassinen, Marko, Konstantin Hyppönen, and Keijo Haataja. "An open, PKI-based mobile payment system." Emerging Trends in Information and Communication Security. Springer Berlin Heidelberg, 2006. 86-100.*

Hassinen, Marko, Konstantin Hyppönen, and Elena Trichina. "Utilizing national public-key infrastructure in mobile payment systems." Electronic Commerce Research and Applications 7.2 (2008): 214-231.*

IEEE. "Amendment 7: Extensions to Direct-Link Setup (DLS)", Oct. 14, 2010.*

Luo, Haiyun, and Songwu Lu. Ubiquitous and robust authentication services for ad hoc wireless networks. Technical Report TR-200030, Dept. of Computer Science, UCLA, 2000.*

Mitchell, Changhua He John C. "Security Analysis and Improvements for IEEE 802.11 i." The 12th Annual Network and Distributed System Security Symposium (NDSS'05) Stanford University, Stanford. 2005.*

Perrig, Adrian, et al. "The TESLA broadcast authentication protocol." (2005).*

Pirzada, Asad Amir, and Chris McDonald. "Kerberos assisted authentication in mobile ad-hoc networks." Proceedings of the 27th Australasian conference on Computer science—vol. 26. Australian Computer Society, Inc., 2004.*

Wikipedia. "Wi-Fi Direct", archived Jan. 9, 2011.*

* cited by examiner

DIRECT MODE COMMUNICATION SYSTEM AND DISCOVERY INTERACTIVE METHOD THEREOF

PRIORITY

This application claims the benefit of U.S. Provisional Application Ser. No. 61/595,133 filed on Feb. 5, 2012, U.S. Provisional Application Ser. No. 61/642,466 filed on May 4, 2012, U.S. Provisional Application Ser. No. 61/672,785 filed on Jul. 18, 2012, and U.S. Provisional Application Ser. No. 61/721,020 filed on Oct. 31, 2012.

FIELD

The present invention relates to a direct-mode communication system and an discovery interactive method thereof; and more particularly, the direct-mode communication system and the discovery interactive method thereof of the present invention can enhance the security of direct-mode communication through authentication by a third party and increase the convenience of using the discovery interactive technology in the direct-mode communication system through direct-mode transmission of interactive messages.

BACKGROUND

In a conventional direct-mode communication system, apparatuses can communicate with each other directly, so messages can be exchanged more simply and rapidly. However, usually no complete security protocol is available for such direct-mode communications, so the direct-mode communications are liable to unauthorized use by malicious persons to forge identifications and to steal information. Accordingly, when the discovery interactive technology is used for the conventional direct-mode communication apparatuses, the security and the stability of these apparatuses will become a significant potential trouble.

Additionally, if it is desired to transmit interactive information to a user apparatus when the discovery interactive technology is used in the conventional direct-mode communication system, usually an interactive information request is firstly transmitted by the user apparatus to a nearby serving apparatus. Then, the serving apparatus transmits the interactive information request to a back-end core network so that the back-end core network broadcasts interactive information to the user apparatus. However, information transmission in this manner is not only relatively complicated, but is also likely to cause a burden on network resources due to redundant information transmission.

Accordingly, an urgent need exists in the art to enhance the security of the direct-mode communication system and increase the convenience of message propagation.

SUMMARY

To solve the aforesaid problems, the present invention provides a direct-mode communication system and an discovery interactive method thereof, which can enhance the security of direct-mode communication through authentication by a third party and increase the convenience of using the discovery interactive technology in the direct-mode communication system through direct-mode transmission of interactive messages.

To achieve the aforesaid objective, certain embodiments of the present invention provide a discovery interactive method for use in a direct-mode communication system. The direct-mode communication system comprises a user direct-mode communication apparatus and a serving direct-mode communication apparatus. The user direct-mode communication apparatus and the serving direct-mode communication apparatus connect to an operating server respectively. The discovery interactive method according to certain embodiments comprises the steps of:

(a) enabling the user direct-mode communication apparatus to authenticate with the operating server to obtain an user authenticated identification;

(b) enabling the serving direct-mode communication apparatus to authenticate with the operating server to obtain a serving authenticated identification;

(c) enabling the user direct-mode communication apparatus to broadcast a discovery signal based on the user authenticated identification;

(d) enabling the serving direct-mode communication apparatus to receive the discovery signal after the user direct-mode communication apparatus enters a default serving range of the serving direct-mode communication apparatus; and (e) enabling the serving direct-mode communication apparatus to provide interactive information to the user direct-mode communication apparatus according to the discovery signal and based on the serving authenticated identification.

To achieve the aforesaid objective, certain embodiments of the present invention further provide a direct-mode communication system, which comprises a user direct-mode communication apparatus and a serving direct-mode communication apparatus. The user direct-mode communication apparatus connects to an operating server and is configured to authenticate with the operating server to obtain a user authenticated identification. The serving direct-mode communication apparatus connects to the operating server and is configured to authenticate with the operating server to obtain a serving authenticated identification. The user direct-mode communication apparatus broadcasts a discovery signal based on the user authenticated identification. The serving direct-mode communication apparatus receives the discovery signal after the user direct-mode communication apparatus enters a default serving range of the serving direct-mode communication apparatus, and provides interactive information to the user direct-mode communication apparatus according to the discovery signal and based on the serving authenticated identification.

The detailed technology and preferred embodiments implemented for the subject invention are described in the following paragraphs accompanying the appended drawings for people skilled in this field to well appreciate the features of the claimed invention.

DETAILED DESCRIPTION

The present invention may be explained with reference to the following example embodiments thereof. However, these example embodiments are not intended to limit the present invention to any specific examples, embodiments, environments, applications or implementations described in these embodiments. Therefore, description of these embodiments is only for purpose of illustration rather than to limit the present invention. In the following embodiments and the attached drawings, elements not directly related to the present invention are omitted from depiction; and dimensional relationships among individual elements in the attached drawings are illustrated only for ease of understanding but not to limit the actual scale.

Figure 1A:
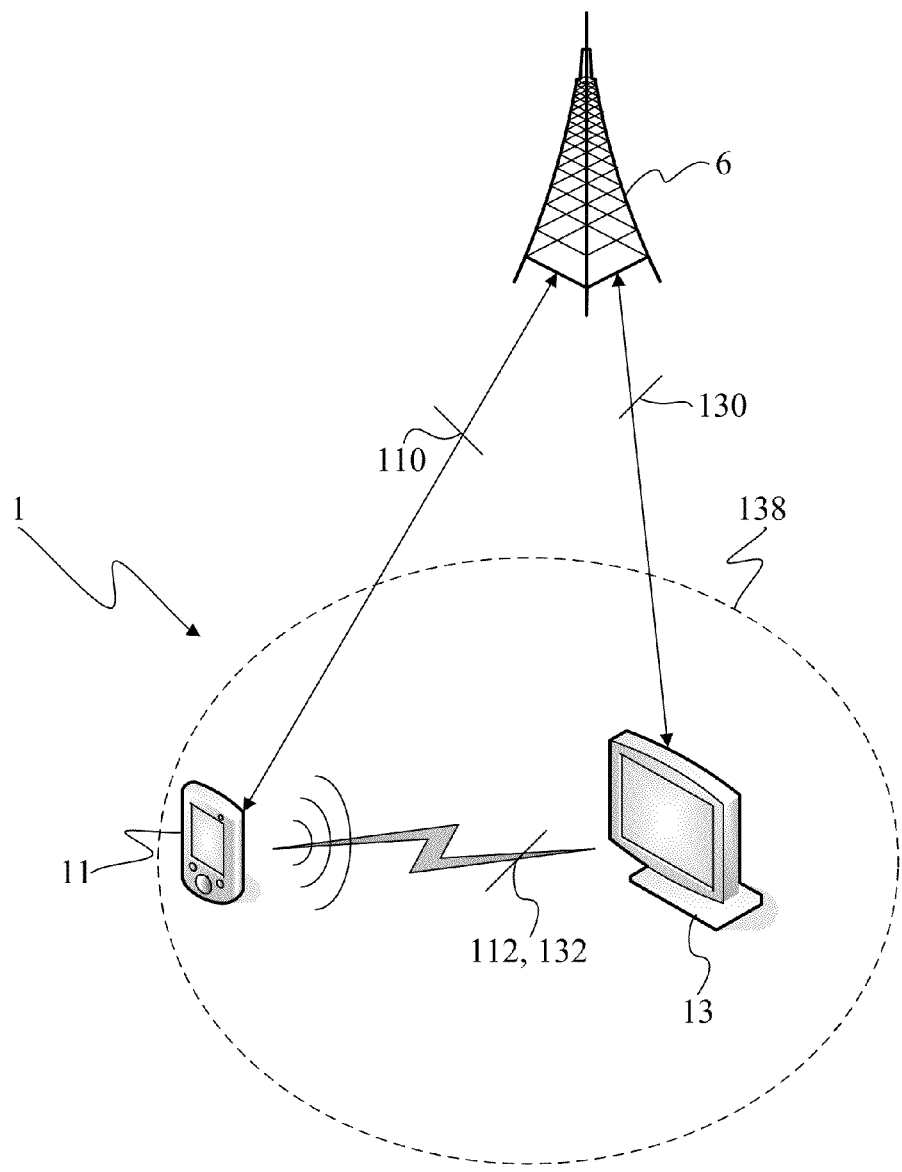
FIG. 1A is a schematic view of a direct-mode communication system according to a first embodiment of the present invention.
Figure 1B:
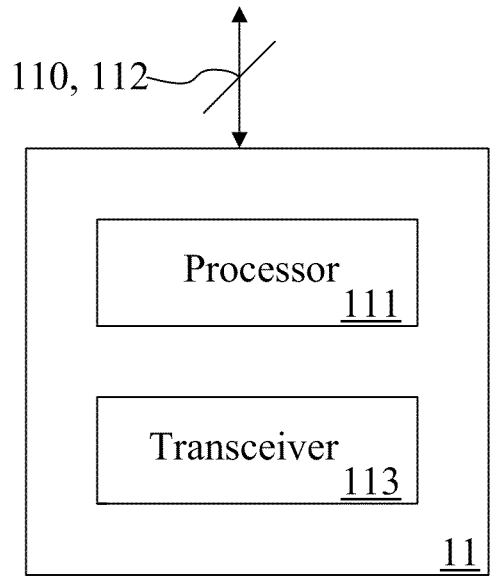
FIG. 1B is a schematic view of an user direct-mode communication apparatus according to the first embodiment of the present invention.
Figure 1C:
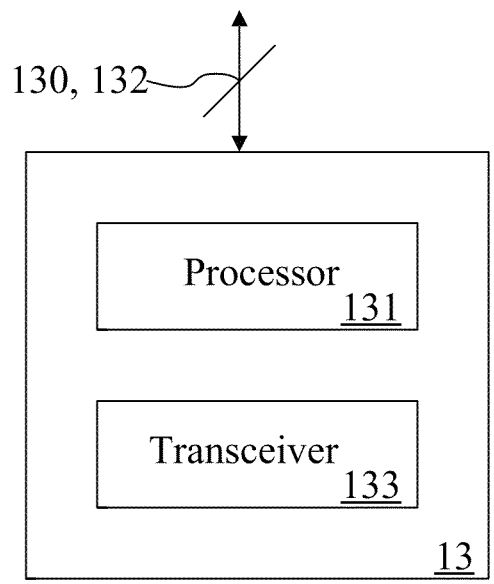
FIG. 1C is a schematic view of a first serving direct-mode communication apparatus according to the first embodiment of the present invention.

Refer to FIG. 1A to FIG. 1C. FIG. 1A is a schematic view of a direct-mode communication system 1 according to a first embodiment of the present invention. The direct-mode communication system 1 comprises a user direct-mode communication apparatus 11 and a first serving direct-mode communication apparatus 13. FIG. 1B is a schematic view of the user direct-mode communication apparatus 11 according to the first embodiment of the present invention. The user direct-mode communication apparatus 11 comprises a processor 111 and a transceiver 113. FIG. 1C is a schematic view of the first serving direct-mode communication apparatus 13 according to the first embodiment of the present invention. The first serving direct-mode communication apparatus 13 comprises a processor 131 and a transceiver 133. Interactions between the network components will be further elucidated hereinbelow.

Firstly, to enable secure communication between the user direct-mode communication apparatus 11 and the first serving direct-mode communication apparatus 13, both the user direct-mode communication apparatus 11 and the first serving direct-mode communication apparatus 13 must authenticate with an authentication system of a third party. Specifically, the processor 111 of the user direct-mode communication apparatus 11 connects to an operating server 6 of the third party via the transceiver 113, and authenticates with the operating server 6 to obtain a user authenticated identification 110. Likewise, the processor 131 of the first serving direct-mode communication apparatus 13 connects to the operating server 6 of the third party via the transceiver 133, and authenticates with the operating server 6 to obtain a first serving authenticated identification 130.

As both the user direct-mode communication apparatus 11 and the first serving direct-mode communication apparatus 13 pass the authentication and obtain the respective authenticated identifications, the user direct-mode communication apparatus 11 and the first serving direct-mode communication apparatus 13 can further exchange information with each other by using the discovery interactive technology and based on the authenticated identifications. In more detail, when the user direct-mode communication apparatus 11 is to acquire interactive information by means of the discovery interactive technology, the processor 111 of the user direct-mode communication apparatus 11 can broadcast a discovery signal 112 via the transceiver 113 based on the user authenticated identification 110 in order to obtain a response from the nearby related serving direct-mode communication apparatus that has also been authenticated.

Then, when the user direct-mode communication apparatus 11 enters a first default serving range 138 of the first serving direct-mode communication apparatus 13, the processor 131 of the first serving direct-mode communication apparatus 13 can receive the discovery signal 112 via the transceiver 133. The discovery signal 112 may comprise related information (e.g., personal information or the like) disclosed by the user direct-mode communication apparatus 11. Accordingly, the first serving direct-mode communication apparatus 13 can provide interactive information 132 to the user direct-mode communication apparatus 11 according to the user related information comprised in the discovery signal 112 and based on the first serving authenticated identification 130 so that the user of the user direct-mode communication apparatus 11 obtains the interactive information 132 via the user direct-mode communication apparatus 11.

Figure 2:
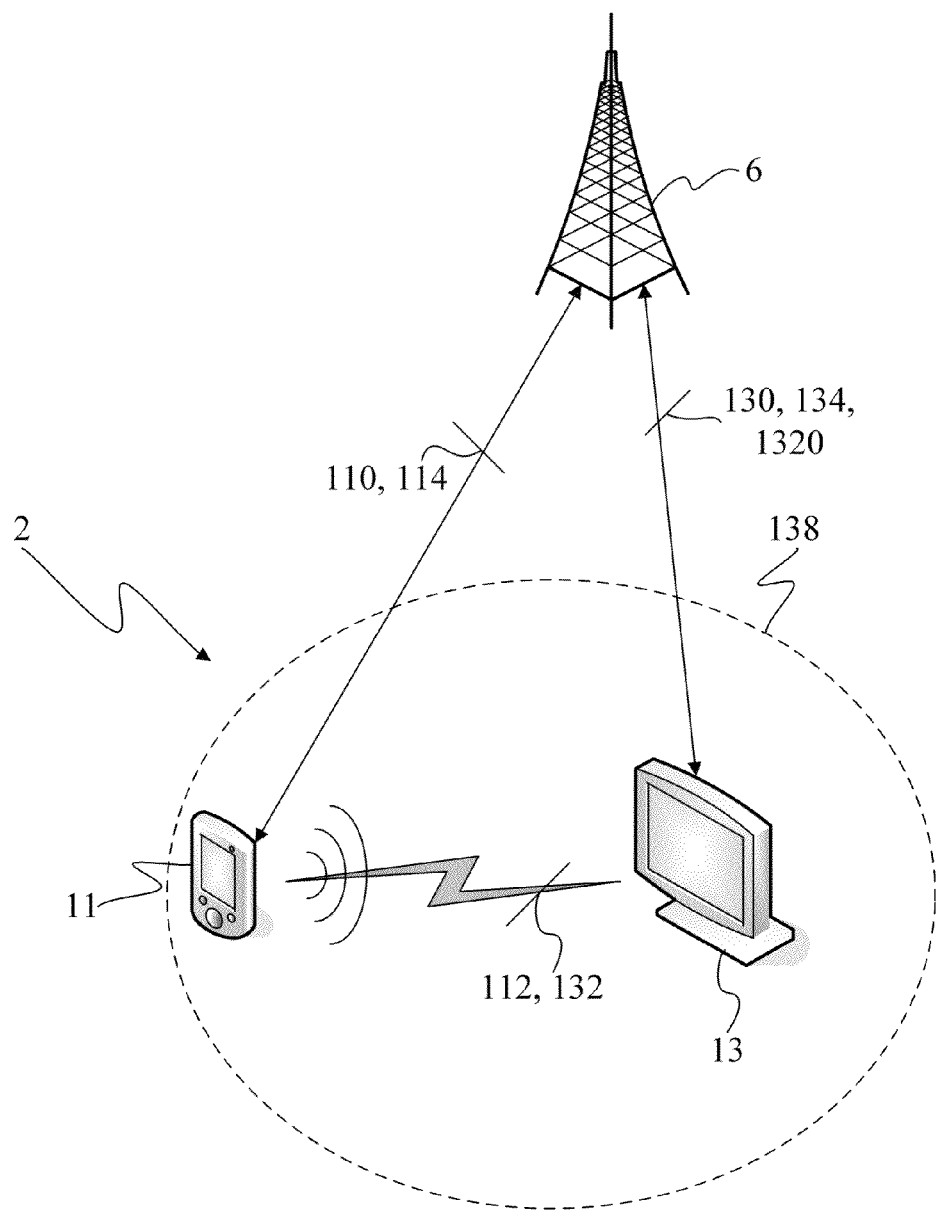
FIG. 2 is a schematic view of a direct-mode communication system according to a second embodiment of the present invention.

Referring to FIG. 2, there is shown a schematic view of a direct-mode communication system 2 according to a second embodiment of the present invention. It shall be particularly appreciated that, the second embodiment has the same system architecture and network connection environment as the previous embodiment, so the components bearing the same reference numerals will also have the same functions and, thus, will not be further described herein. However, the second embodiment differs from the previous embodiment in that, in the second embodiment, the authentication process will be described in more detail and the use of the interactive information will be illustrated.

Specifically, the processor 111 of the user direct-mode communication apparatus 11 transmits a user authentication request signal 114 to the operating server 6 via the transceiver 113. Then, the operating server 6 can generate the user authenticated identification 110 according to the user authentication request signal 114 and transmit the user authenticated identification 110 to the user direct-mode communication apparatus 11; that is, the processor 111 of the user direct-mode communication apparatus 11 receives the user authenticated identification 110 from the operating server 6 via the transceiver 113.

Likewise, the processor 131 of the first serving direct-mode communication apparatus 13 transmits a first serving authentication request signal 134 to the operating server 6 via the transceiver 133. Then, the operating server 6 can also generate the first serving authenticated identification 130 according to the first serving authentication request signal 134 and transmit the first serving authenticated identification 130 to the first serving direct-mode communication apparatus 13; that is, the processor 131 of the first serving direct-mode communication apparatus 13 receives the first serving authenticated identification 130 from the operating server 6 via the transceiver 133.

Subsequently, when the user direct-mode communication apparatus 11 enters the first default serving range 138 of the first serving direct-mode communication apparatus 13 and the processor 111 of the user direct-mode communication apparatus 11 broadcasts the discovery signal 112 via the transceiver 113 based on the user authenticated identification 110, the processor 131 of the first serving direct-mode communication apparatus 13 firstly determines whether the user direct-mode communication apparatus 11 is legal according to the user authenticated identification 110. If it is determined that the user direct-mode communication apparatus 11 is legal, then the processor 131 of the first serving direct-mode communication apparatus 13 will receive the discovery signal 112 via the transceiver 133; and otherwise, the processor 131 of the first serving direct-mode communication apparatus 13 will ignore the discovery signal 112.

Similarly, when the first serving direct-mode communication apparatus 13 is to send the interactive information 132 to the user direct-mode communication apparatus 11, the processor 111 of the user direct-mode communication apparatus 11 also firstly determines whether the first serving direct-mode communication apparatus 13 is legal according to the first serving authenticated identification 130. If it is determined that the first serving direct-mode communication apparatus 13 is legal, then the processor 111 of the user direct-mode communication apparatus 11 will obtain the interactive information 132 via the transceiver 113; and otherwise, the processor 111 of the user direct-mode communication apparatus 11 will ignore the interactive information 132. Accordingly, through the aforesaid detailed authentication steps, the direct-mode communication apparatuses can directly exchange information securely according to each other's authenticated identification.

For example, when the user direct-mode communication apparatus 11 and the first serving direct-mode communication apparatus 13 are to conduct an expenditure behavior through discovery interactive, the first serving direct-mode communication apparatus 13 may incorporate expenditure information 1320 into the interactive information 132. Then, when the first serving direct-mode communication apparatus 13 provides the interactive information 132 to the user direct-mode communication apparatus 11 (i.e., provides an expenditure notification), the processor 131 of the first serving direct-mode communication apparatus 13 can transmit the expenditure information 1320 to the operating server 6 via the transceiver 133. The expenditure related information is recorded in the operating server 6, so the merchant can transmit a payment request to the host of the operating server 6 at a constant time interval. Thus, the convenience in use can be increased.

Figure 3:
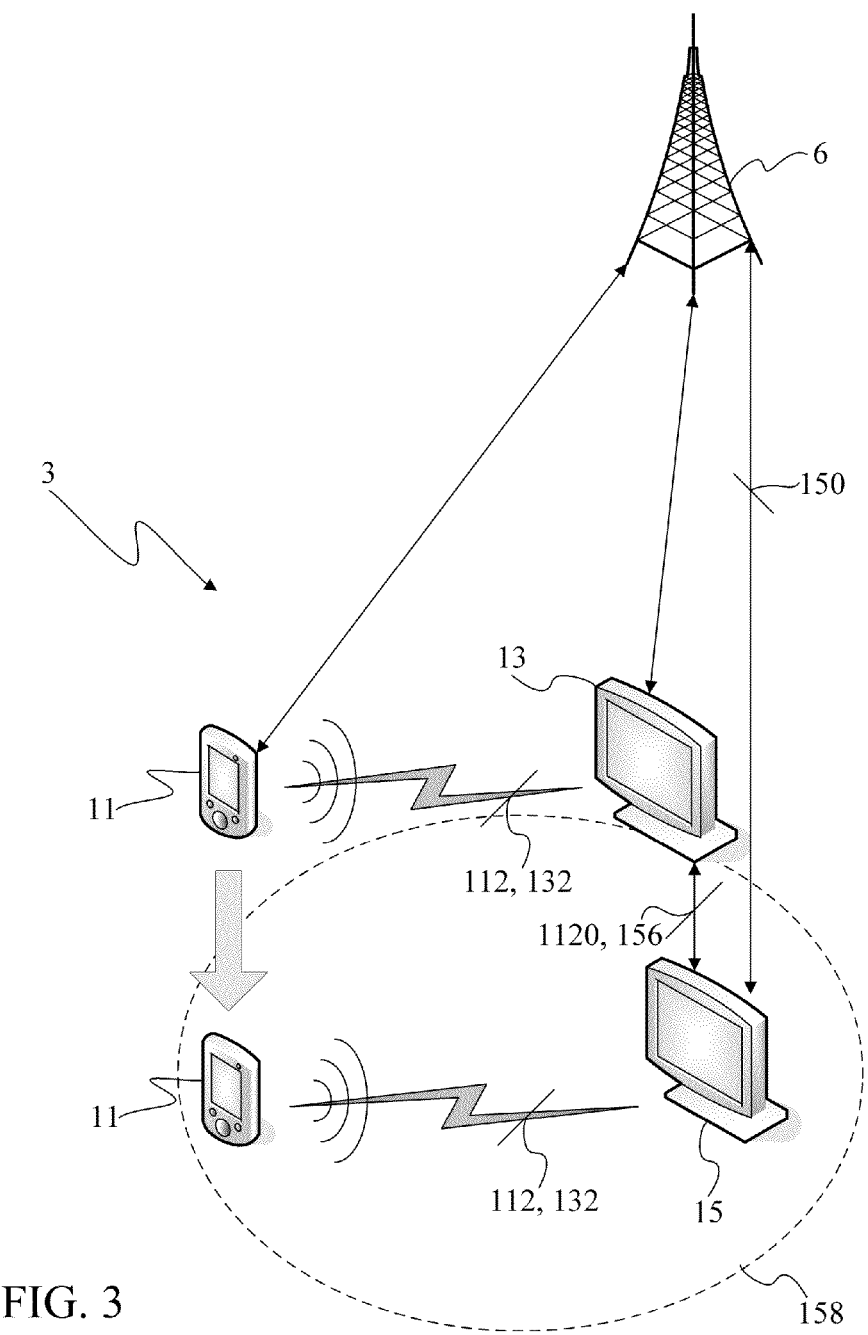
FIG. 3 is a schematic view of a direct-mode communication system according to a third embodiment of the present invention.

Referring to FIG. 3, there is shown a schematic view of a direct-mode communication system 3 according to a third embodiment of the present invention. The first serving direct-mode communication apparatus 13 further connects to a second serving direct-mode communication apparatus 15, and the second serving direct-mode communication apparatus 15 has also authenticated with the operating server 6 to obtain a second serving authenticated identification 150. It shall be particularly appreciated that, the third embodiment has the same system architecture and network connection environment as the previous embodiments, so the components bearing the same reference numerals will also have the same functions and, thus, will not be further described herein. However, mainly described in the third embodiment are different implementations of interactions between the apparatuses when the user direct-mode communication apparatus 11 exchanges the interactive information with the first serving direct-mode communication apparatus 13 while it is moving to a second serving range 158 of the second serving direct-mode communication apparatus 15.

Specifically, in the third embodiment, the discovery signal 112 comprises a user identifier 1120 representing the user direct-mode communication apparatus 11. Accordingly, after the discovery signal 112 is received by the first serving direct-mode communication apparatus 13, the processor 131 can forward the user identifier 1120 comprised in the discovery signal 112 to the second serving direct-mode communication apparatus 15 via the transceiver 133. Thus, after determining that the user direct-mode communication apparatus 11 enters the second default serving range 158, the second serving direct-mode communication apparatus 15 can successively provide the interactive information 132 to the user direct-mode communication apparatus 11 according to the discovery signal 112 comprising the user identifier 1120 and based on the second serving authenticated identification 150.

In brief, the first serving direct-mode communication apparatus 13 that has received the discovery signal 112 transmits the discovery signal 112 comprising the user identifier 1120 to the second serving direct-mode communication apparatus 15 so that the second serving direct-mode communication apparatus 15 can be informed that the first serving direct-mode communication apparatus 13 is providing the interactive information 132 to the user direct-mode communication apparatus 11. Thus, after the user direct-mode communication apparatus 11 moves into the serving range 158 of the second serving direct-mode communication apparatus 15, the second serving direct-mode communication apparatus 15 can directly replace the first serving direct-mode communication apparatus 13 to successively provide the interactive information 132 to the user direct-mode communication apparatus 11.

In another implementation of the third embodiment, the processor 131 of the first serving direct-mode communication apparatus 13 firstly detects via the transceiver 133 that the user direct-mode communication apparatus 11 enters the second default serving range 158 of the second serving direct-mode communication apparatus 15. Then, the processor 131 of the first serving direct-mode communication apparatus 13 forwards the user identifier 1120 comprised in the discovery signal 112 to the second serving direct-mode communication apparatus 15 via the transceiver 133. Thus, the second serving direct-mode communication apparatus 15 can successively provide the interactive information 132 to the user direct-mode communication apparatus 11 according to the discovery signal 112 comprising the user identifier 1120 and based on the second serving authenticated identification 150.

In brief, the first serving direct-mode communication apparatus 13 firstly detects that the user direct-mode communication apparatus 11 has moved into the second default serving range 158, and then transmits the discovery signal 112 comprising the user identifier 1120 to the second serving direct-mode communication apparatus 15. Thus, the second serving direct-mode communication apparatus 15 can directly replace the first serving direct-mode communication apparatus 13 to successively provide the interactive information 132 to the user direct-mode communication apparatus 11.

In a further implementation of the third embodiment, the second serving direct-mode communication apparatus 15 detects by itself that the user direct-mode communication apparatus 11 enters the second default serving range 158. Then, the second serving direct-mode communication apparatus 15 captures the user identifier 1120 comprised in the discovery signal 112 of the user direct-mode communication apparatus 11 and then transmits an interactive information request message 156 comprising the user identifier 1120 to the first serving direct-mode communication apparatus 13 to request the related information of the user direct-mode communication apparatus 11. Then, the processor 131 of the first serving direct-mode communication apparatus 13 transmits the interactive information 132 corresponding to the user identifier 1120 to the second serving direct-mode communication apparatus 15 via the transceiver 133 according to the interactive information request message 156. Thus, the second serving direct-mode communication apparatus 15 can directly replace the first serving direct-mode communication apparatus 13 to successively provide the interactive information 132 to the user direct-mode communication apparatus 11.

In brief, the first serving direct-mode communication apparatus 13 waits for a request from the second serving direct-mode communication apparatus 15, and will not transmit the interactive information 132 to the second serving direct-mode communication apparatus until the second serving direct-mode communication apparatus 15 determines that the user direct-mode communication apparatus 11 enters the serving range thereof and requests the information related to the user direct-mode communication apparatus 11 from the first serving direct-mode communication apparatus 13. Thus, the second serving direct-mode communication apparatus 15 can further replace the first serving direct-mode communication apparatus 13 to successively provide the interactive information 132 to the user direct-mode communication apparatus 11.

Figure 4A:
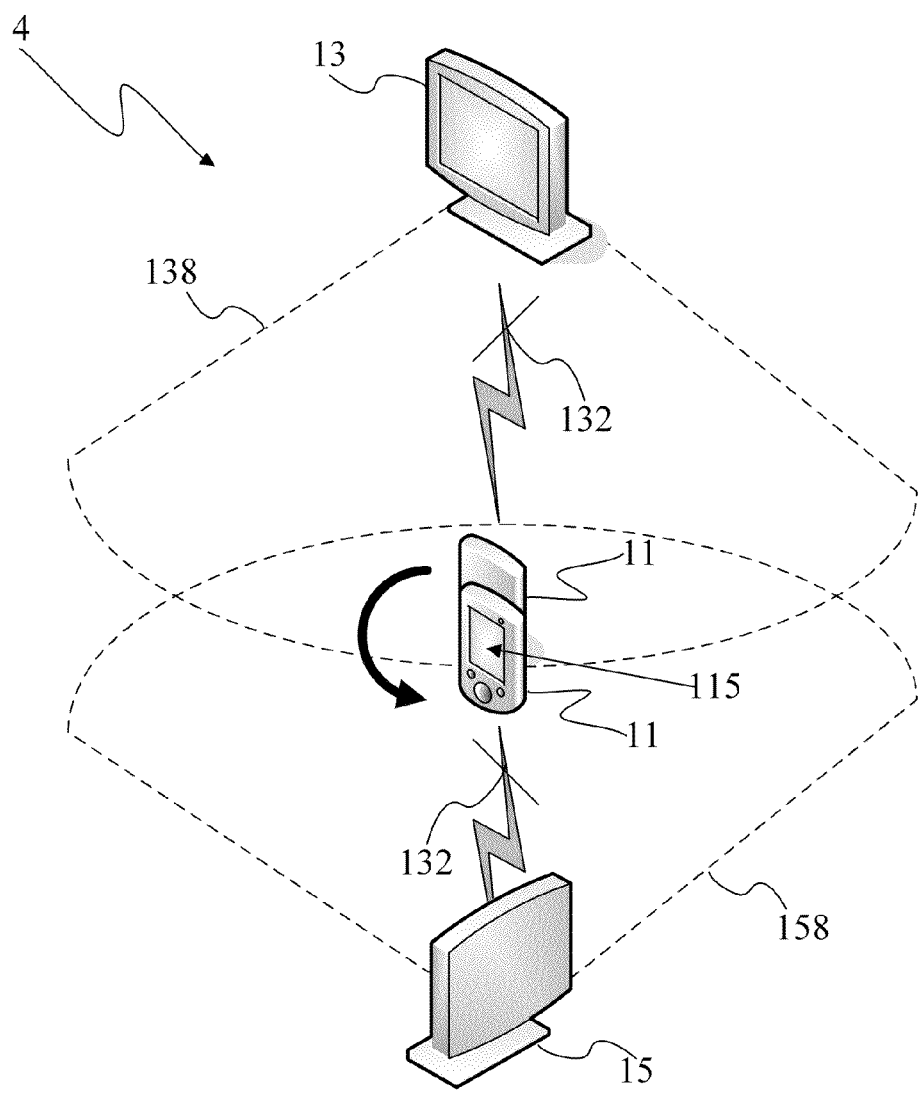
FIG. 4A is a schematic view of a direct-mode communication system according to a fourth embodiment of the present invention.
Figure 4B:
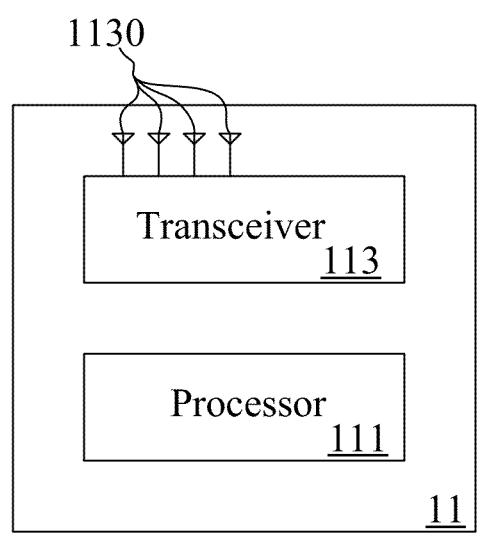
FIG. 4B is a schematic view of a user direct-mode communication apparatus according to the fourth embodiment of the present invention.

It shall be particularly appreciated that, the aforesaid default serving ranges may be determined according to the type of hardware of the user direct-mode communication apparatus and the serving direct-mode communication apparatuses. Refer to FIG. 4A and FIG. 4B together. FIG. 4A is a schematic view of a direct-mode communication system 4 according to a fourth embodiment of the present invention. FIG. 4B is a schematic view of a user direct-mode communication apparatus 11 according to the fourth embodiment of the present invention. It shall be emphasized that, the fourth embodiment has the same system architecture and network connection environment as the previous embodiments, so the components bearing the same reference numerals will also have the same functions and, thus, will not be further described herein.

Specifically, in the fourth embodiment, the transceiver 113 of the user direct-mode communication apparatus 11 further comprises a plurality of antennae 1130 configured to form an apparatus main communication surface 115. Accordingly, when the communication of the user direct-mode communication apparatus 11 is directional, whether the user direct-mode communication apparatus 11 is located within a default serving range of a serving direct-mode communication apparatus can be determined by changing the orientation.

Further speaking, if the user direct-mode communication apparatus 11 is provided with the apparatus main communication surface 115 through disposition of the plurality of antennae 1130, then the first serving direct-mode communication apparatus 13 can provide the interactive information 132 to the user direct-mode communication apparatus 11 only when the apparatus main communication surface 115 of the user direct-mode communication apparatus 11 is oriented to face towards the first default serving range 138 of the first serving direct-mode communication apparatus 13. And only when the apparatus main communication surface 115 of the user direct-mode communication apparatus 11 changes to be oriented to face towards the second default serving range 158 of the second serving direct-mode communication apparatus 15 instead, can the second serving direct-mode communication apparatus 15 successively provide the interactive information 132 to the user direct-mode communication apparatus 11.

Figure 5:
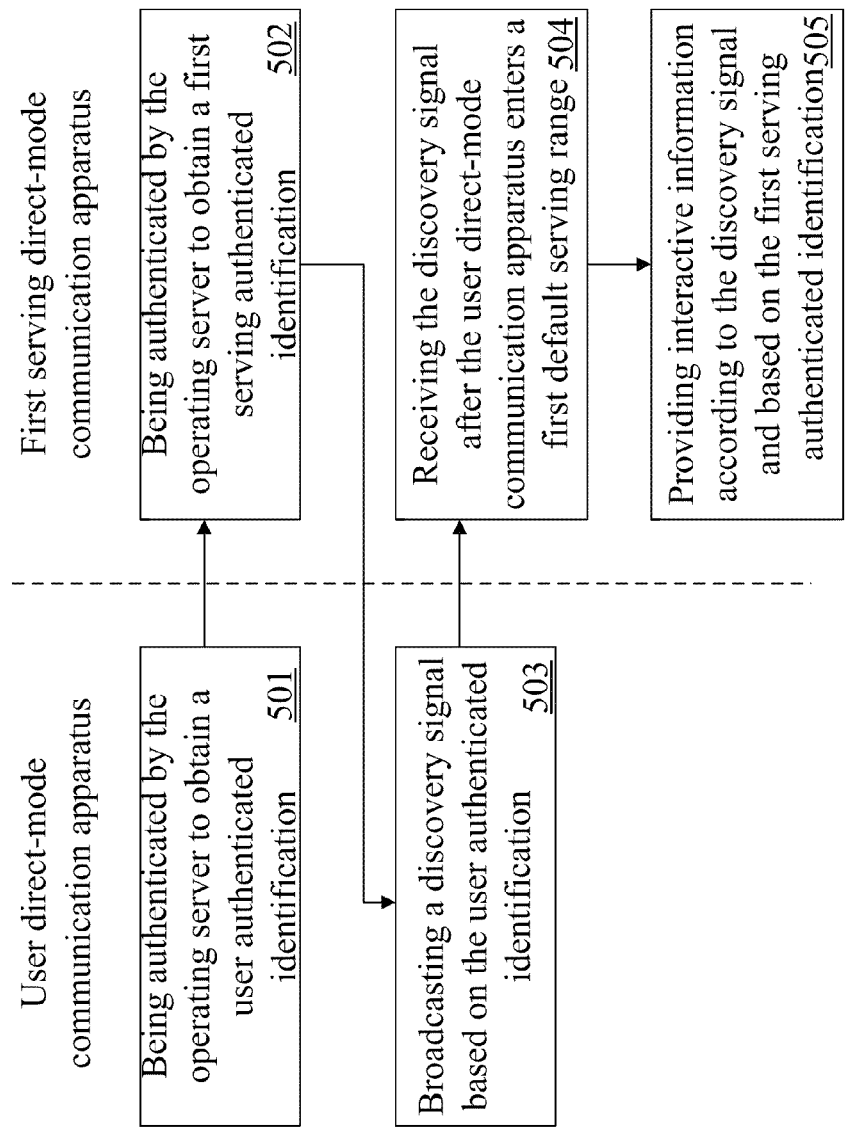
FIG. 5 is a flowchart diagram of a discovery interactive method according to a fifth embodiment of the present invention.

A fifth embodiment of the present invention is a discovery interactive method, a flowchart diagram of which is shown in FIG. 5. The method of the fifth embodiment is for use in a direct-mode communication system (e.g., the direct-mode communication system 1 of the previous embodiment) and an user direct-mode communication apparatus and a first serving direct-mode communication apparatus that are comprised in the direct-mode communication system (e.g., the user direct-mode communication apparatus 11 and the first serving direct-mode communication apparatus 13 of the previous embodiment). The user direct-mode communication apparatus and the first serving direct-mode communication apparatus connect to an operating server respectively. The steps of the fifth embodiment are detailed as follows.

Firstly, step 501 is executed to enable the user direct-mode communication apparatus to authenticate with the operating server to obtain a user authenticated identification. Step 502 is executed to enable the first serving direct-mode communication apparatus to authenticate with the operating server to obtain a first serving authenticated identification. Accordingly, the user direct-mode communication apparatus and the first serving direct-mode communication apparatus can further exchange information with each other by using the discovery interactive technology and based on the authenticated identifications.

Next, step 503 is executed to enable the user direct-mode communication apparatus to broadcast a discovery signal based on the user authenticated identification. Step 504 is executed to enable the first serving direct-mode communication apparatus to receive the discovery signal after the user direct-mode communication apparatus enters a first default serving range of the first serving direct-mode communication apparatus. Finally, step 505 is executed to enable the first serving direct-mode communication apparatus to provide interactive information to the user direct-mode communication apparatus according to the discovery signal and based on the first serving authenticated identification.

Figure 6:
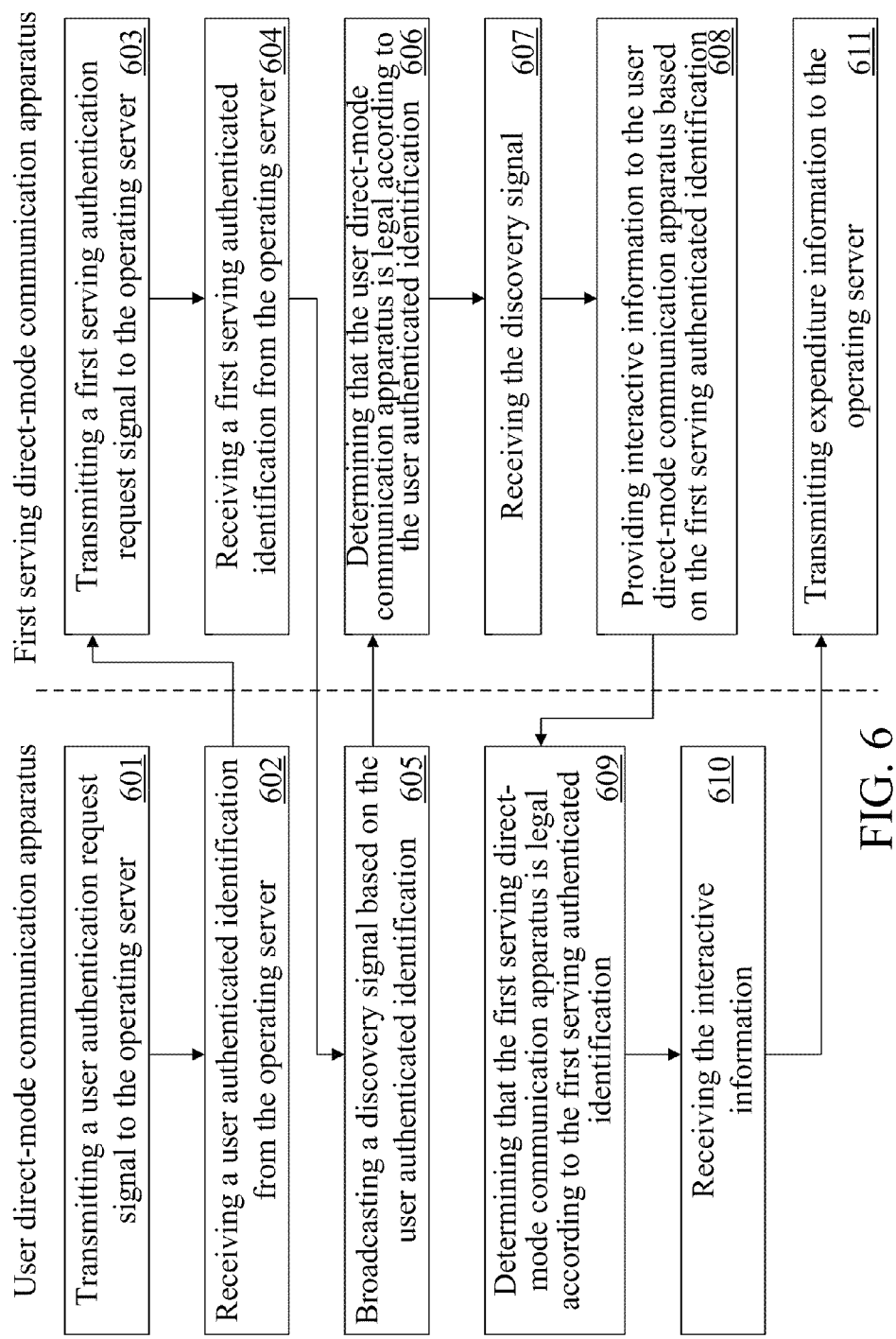
FIG. 6 is a flowchart diagram of a discovery interactive method according to a sixth embodiment of the present invention.

A sixth embodiment of the present invention is a discovery interactive method, a flowchart diagram of which is shown in FIG. 6. The method of the sixth embodiment is for use in a direct-mode communication system (e.g., the direct-mode communication system 2 of the previous embodiment) and an user direct-mode communication apparatus and a first serving direct-mode communication apparatus that are comprised in the direct-mode communication system (e.g., the user direct-mode communication apparatus 11 and the first serving direct-mode communication apparatus 13 of the previous embodiment). The user direct-mode communication apparatus and the first serving direct-mode communication apparatus connect to an operating server respectively. The steps of the sixth embodiment are detailed as follows.

Firstly, step 601 is executed to enable the user direct-mode communication apparatus to transmit a user authentication request signal to the operating server. Step 602 is executed to enable the user direct-mode communication apparatus to receive a user authenticated identification from the operating server. Step 603 is executed to enable the first serving direct-mode communication apparatus to transmit a first serving authentication request signal to the operating server. Step 604 is executed to enable the first serving direct-mode communication apparatus to receive a first serving authenticated identification from the operating server. Next, step 605 is executed to enable the user direct-mode communication apparatus to broadcast a discovery signal based on the user authenticated identification. Step 606 is executed to enable the first serving direct-mode communication apparatus to determine that the user direct-mode communication apparatus is legal according to the user authenticated identification after the user direct-mode communication apparatus enters a first default serving range of the first serving direct-mode communication apparatus.

Step 607 is executed to enable the first serving direct-mode communication apparatus to receive the discovery signal. Step 608 is executed to enable the first serving direct-mode communication apparatus to provide interactive information to the user direct-mode communication apparatus according to the discovery signal and based on the first serving authenticated identification. Next, step 609 is executed to enable the user direct-mode communication apparatus to determine that the first serving direct-mode communication apparatus is legal according to the first serving authenticated identification. Step 610 is executed to enable the user direct-mode communication apparatus to receive the interactive information. Finally, step 611 is executed to enable the first serving direct-mode communication apparatus to transmit expenditure information to the operating server so that the operating server manages the expenditure related information.

Figure 7:
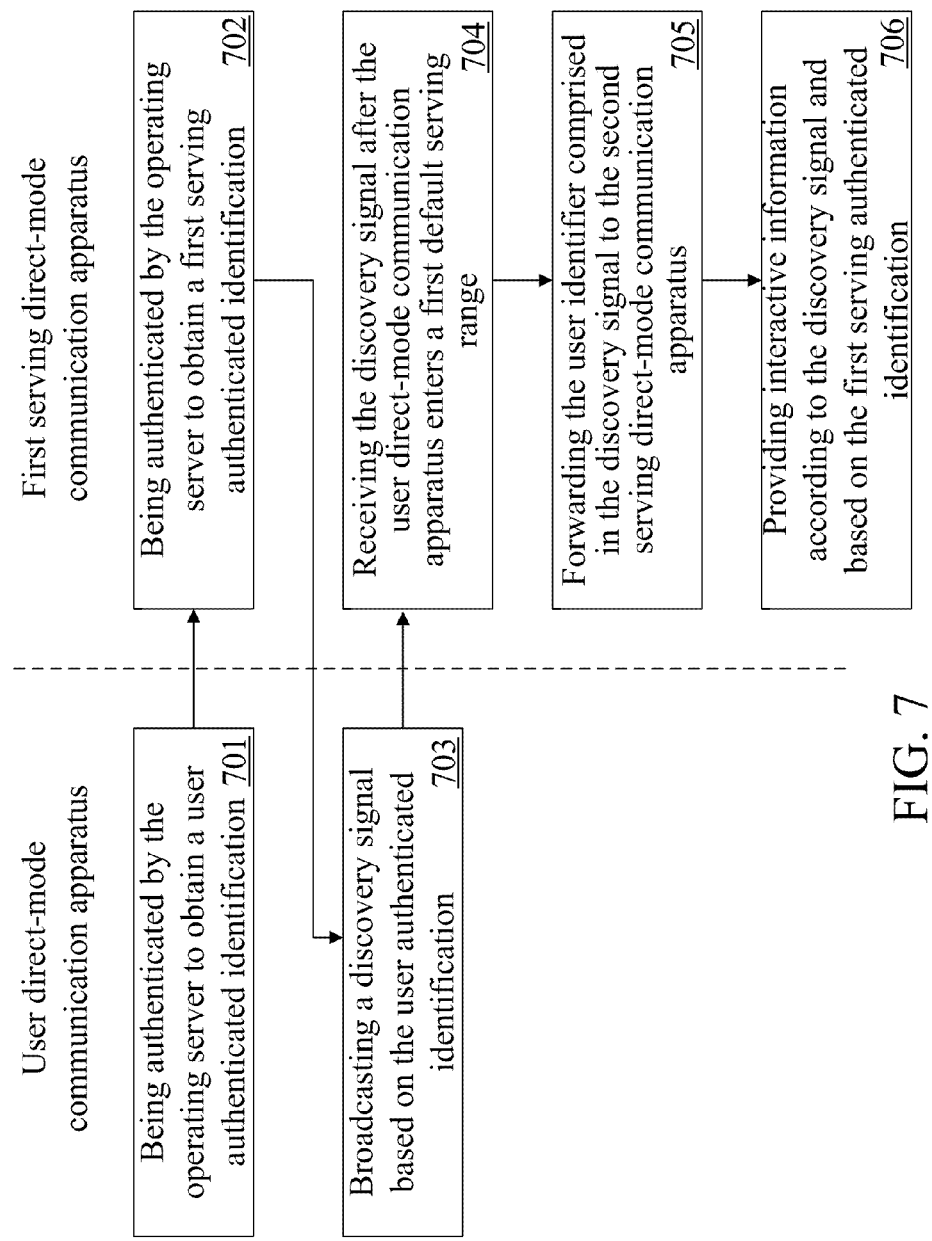
FIG. 7 is a flowchart diagram of a discovery interactive method according to a seventh embodiment of the present invention.

A seventh embodiment of the present invention is a discovery interactive method, a flowchart diagram of which is shown in FIG. 7. The method of the seventh embodiment is for use in a direct-mode communication system (e.g., the direct-mode communication system 3 of the previous embodiment) and an user direct-mode communication apparatus and a first serving direct-mode communication apparatus that are comprised in the direct-mode communication system (e.g., the user direct-mode communication apparatus 11 and the first serving direct-mode communication apparatus 13 of the previous embodiment). The user direct-mode communication apparatus and the first serving direct-mode communication apparatus connect to an operating server respectively. The first serving direct-mode communication apparatus further connects to a second serving direct-mode communication apparatus, and the second serving direct-mode communication apparatus has a second serving authenticated identification obtained through authenticating with the operating server. The steps of the seventh embodiment are detailed as follows.

Firstly, step 701 is executed to enable the user direct-mode communication apparatus to authenticate with the operating server to obtain a user authenticated identification. Step 702 is executed to enable the first serving direct-mode communication apparatus to authenticate with the operating server to obtain a first serving authenticated identification. Accordingly, the user direct-mode communication apparatus and the first serving direct-mode communication apparatus can further exchange information with each other by using the discovery interactive technology and based on the authenticated identifications.

Next, step 703 is executed to enable the user direct-mode communication apparatus to broadcast a discovery signal based on the user authenticated identification. The discovery signal comprises a user identifier of the user direct-mode communication apparatus. Step 704 is executed to enable the first serving direct-mode communication apparatus to receive the discovery signal after the user direct-mode communication apparatus enters a first default serving range of the first serving direct-mode communication apparatus. Step 705 is executed to enable the first serving direct-mode communication apparatus to forward the user identifier comprised in the discovery signal to the second serving direct-mode communication apparatus.

Finally, step 706 is executed to enable the first serving direct-mode communication apparatus to provide interactive information to the user direct-mode communication apparatus according to the discovery signal and based on the first serving authenticated identification. Because the first serving direct-mode communication apparatus has firstly forwarded the user identifier comprised in the discovery signal to the second serving direct-mode communication apparatus, the second serving direct-mode communication apparatus can successively provide the interactive information to the user direct-mode communication apparatus according to the discovery signal comprising the user identifier and based on the second serving authenticated identification after determining that the user direct-mode communication apparatus enters a second default serving range of the second serving direct-mode communication apparatus.

Figure 8:
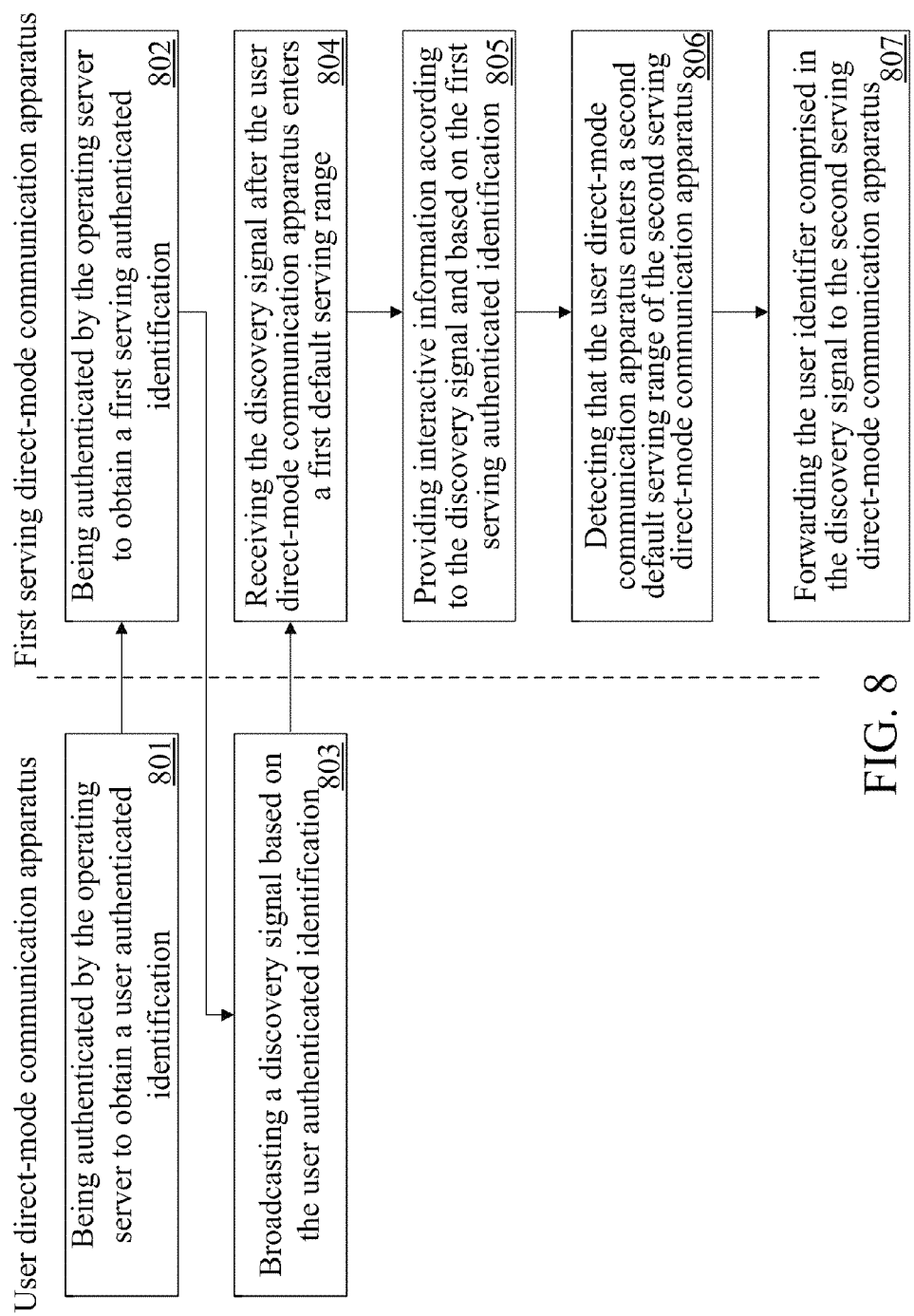
FIG. 8 is a flowchart diagram of a discovery interactive method according to an eighth embodiment of the present invention.

An eighth embodiment of the present invention is a discovery interactive method, a flowchart diagram of which is shown in FIG. 8. The method of the eighth embodiment is for use in a direct-mode communication system (e.g., the direct-mode communication system 3 of the previous embodiment) and an user direct-mode communication apparatus and a first serving direct-mode communication apparatus that are comprised in the direct-mode communication system (e.g., the user direct-mode communication apparatus 11 and the first serving direct-mode communication apparatus 13 of the previous embodiment). The user direct-mode communication apparatus and the first serving direct-mode communication apparatus connect to an operating server respectively. The first serving direct-mode communication apparatus further connects to a second serving direct-mode communication apparatus, and the second serving direct-mode communication apparatus has a second serving authenticated identification obtained through authenticating with the operating server. The steps of the eighth embodiment are detailed as follows.

Firstly, step 801 is executed to enable the user direct-mode communication apparatus to authenticating with the operating server to obtain a user authenticated identification. Step 802 is executed to enable the first serving direct-mode communication apparatus to authenticating with the operating server to obtain a first serving authenticated identification. Accordingly, the user direct-mode communication apparatus and the first serving direct-mode communication apparatus can further exchange information with each other by using the discovery interactive technology and based on the authenticated identifications.

Next, step 803 is executed to enable the user direct-mode communication apparatus to broadcast a discovery signal based on the user authenticated identification. The discovery signal comprises an user identifier of the user direct-mode communication apparatus. Step 804 is executed to enable the first serving direct-mode communication apparatus to receive the discovery signal after the user direct-mode communication apparatus enters a first default serving range of the first serving direct-mode communication apparatus. Step 805 is executed to enable the first serving direct-mode communication apparatus to provide interactive information to the user direct-mode communication apparatus according to the discovery signal and based on the first serving authenticated identification.

Then, step 806 is executed to enable the first serving direct-mode communication apparatus to detect that the user direct-mode communication apparatus enters a second default serving range of the second serving direct-mode communication apparatus. Finally, step 807 is executed to enable the first serving direct-mode communication apparatus to forward the user identifier comprised in the discovery signal to the second serving direct-mode communication apparatus. Thus, the second serving direct-mode communication apparatus can successively provide the interactive information to the user direct-mode communication apparatus according to the discovery signal comprising the user identifier and based on the second serving authenticated identification.

Figure 9:
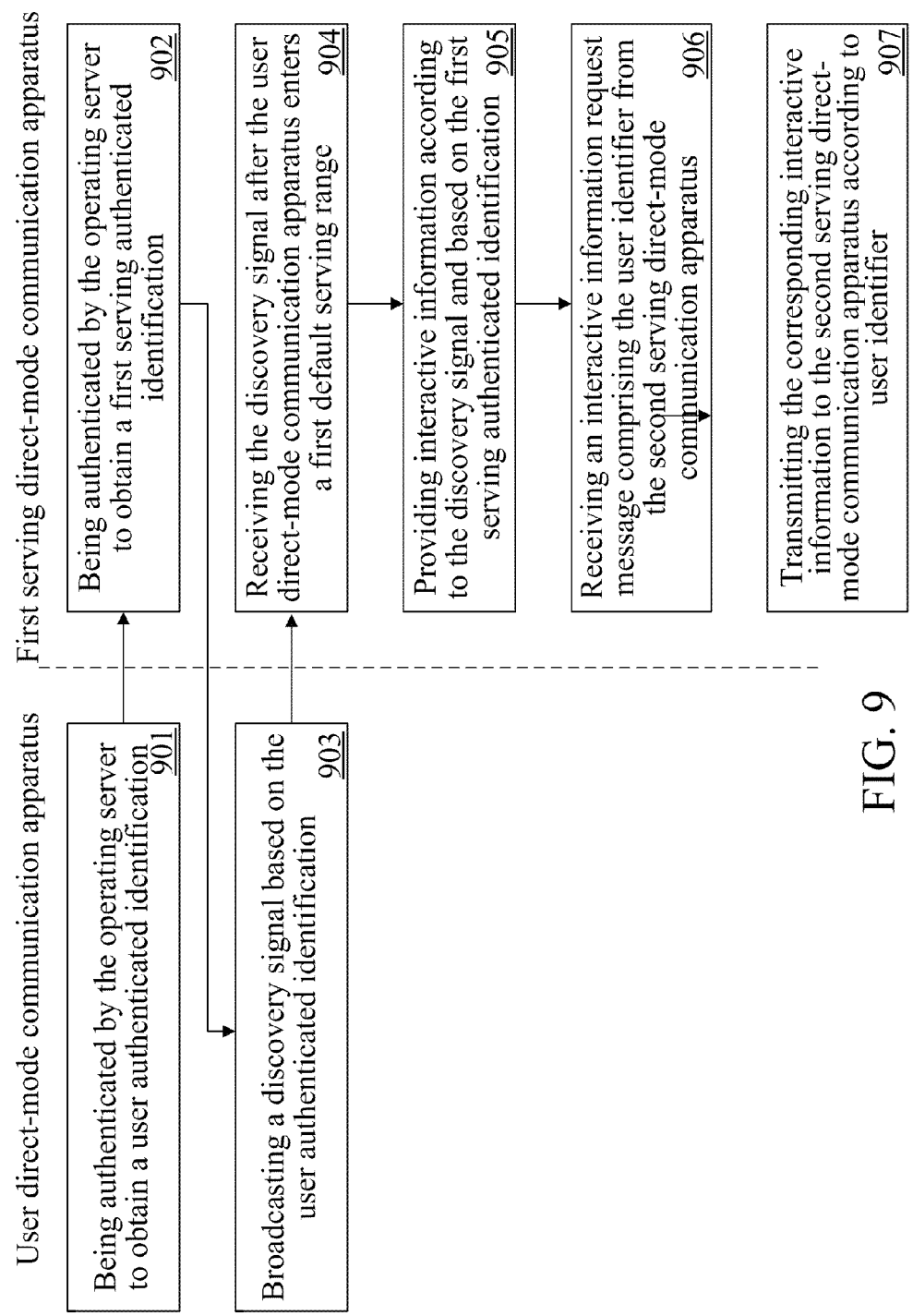
FIG. 9 is a flowchart diagram of a discovery interactive method according to a ninth embodiment of the present invention.

A ninth embodiment of the present invention is a discovery interactive method, a flowchart diagram of which is shown in FIG. 9. The method of the ninth embodiment is for use in a direct-mode communication system (e.g., the direct-mode communication system 3 of the previous embodiment) and an user direct-mode communication apparatus and a first serving direct-mode communication apparatus that are comprised in the direct-mode communication system (e.g., the user direct-mode communication apparatus 11 and the first serving direct-mode communication apparatus 13 of the previous embodiment). The user direct-mode communication apparatus and the first serving direct-mode communication apparatus connect to an operating server respectively. The first serving direct-mode communication apparatus further connects to a second serving direct-mode communication apparatus, and the second serving direct-mode communication apparatus has a second serving authenticated identification obtained through authenticating with the operating server. The steps of the ninth embodiment are detailed as follows.

Firstly, step 901 is executed to enable the user direct-mode communication apparatus to authenticate with the operating server to obtain a user authenticated identification. Step 902 is executed to enable the first serving direct-mode communication apparatus to authenticate with the operating server to obtain a first serving authenticated identification. Accordingly, the user direct-mode communication apparatus and the first serving direct-mode communication apparatus can further exchange information with each other by using the discovery interactive technology and based on the authenticated identifications.

Next, step 903 is executed to enable the user direct-mode communication apparatus to broadcast a discovery signal based on the user authenticated identification. The discovery signal comprises a user identifier of the user direct-mode communication apparatus. Step 904 is executed to enable the first serving direct-mode communication apparatus to receive the discovery signal after the user direct-mode communication apparatus enters a first default serving range of the first serving direct-mode communication apparatus. Step 905 is executed to enable the first serving direct-mode communication apparatus to provide interactive information to the user direct-mode communication apparatus according to the discovery signal and based on the first serving authenticated identification.

Then, step 906 is executed to enable the first serving direct-mode communication apparatus to receive an interactive information request message comprising the user identifier from the second serving direct-mode communication apparatus. Finally, step 907 is executed to enable the first serving direct-mode communication apparatus to transmit the interactive information corresponding to the user identifier to the second serving direct-mode communication apparatus according to the interactive information request message comprising the user identifier. Thus, the second serving direct-mode communication apparatus can successively provide the interactive information to the user direct-mode communication apparatus based on the second serving authenticated identification.

Figure 10:
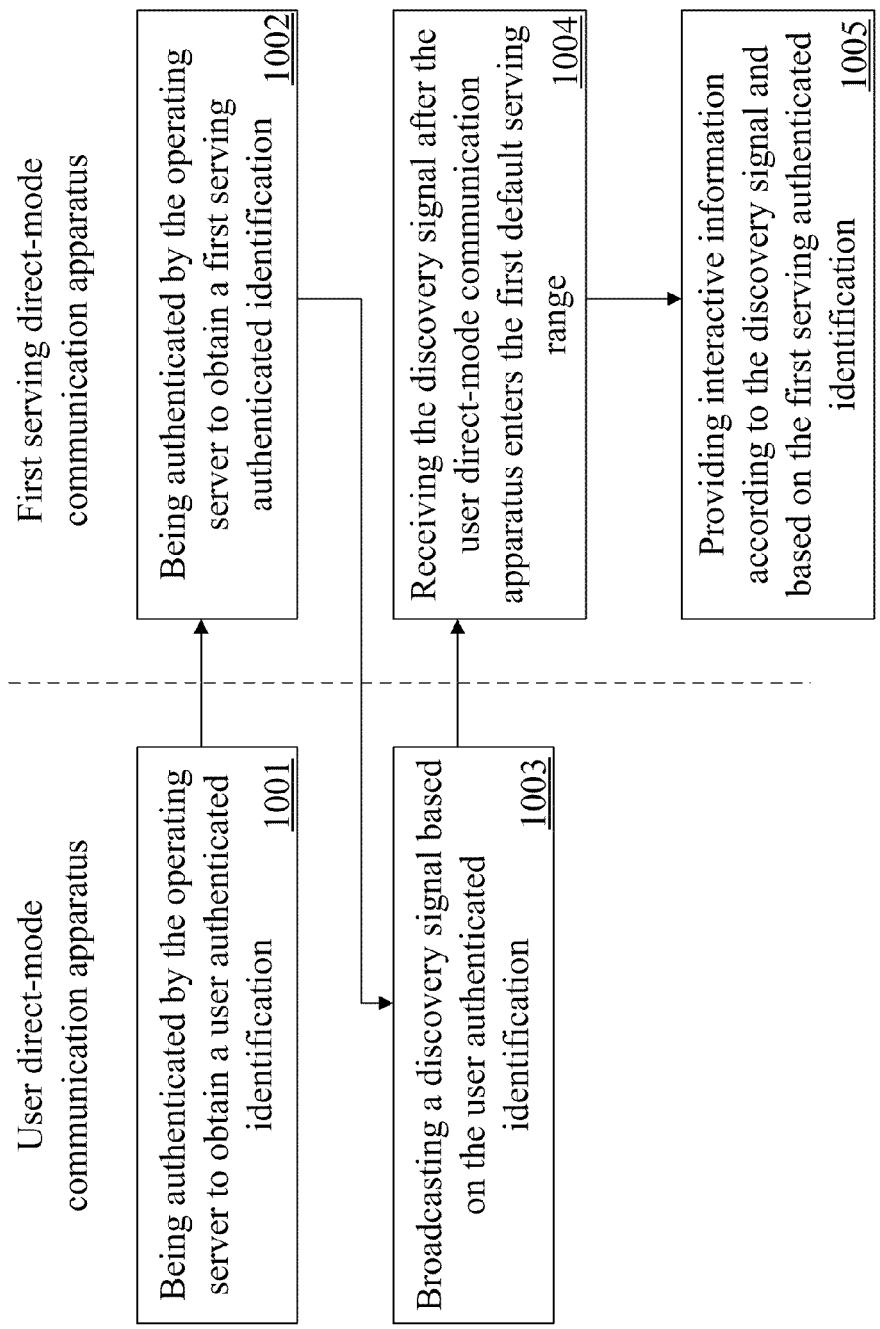
FIG. 10 is a flowchart diagram of a discovery interactive method according to a tenth embodiment of the present invention.

A tenth embodiment of the present invention is a discovery interactive method, a flowchart diagram of which is shown in FIG. 10. The method of the tenth embodiment is for use in a direct-mode communication system (e.g., the direct-mode communication system 4 of the previous embodiment) and an user direct-mode communication apparatus and a first serving direct-mode communication apparatus that are comprised in the direct-mode communication system (e.g., the user direct-mode communication apparatus 11 and the first serving direct-mode communication apparatus 13 of the previous embodiment). The user direct-mode communication apparatus and the first serving direct-mode communication apparatus connect to an operating server respectively, and the user direct-mode communication apparatus has an apparatus main communication surface. The steps of the tenth embodiment are detailed as follows.

Firstly, step 1001 is executed to enable the user direct-mode communication apparatus to authenticate with the operating server to obtain a user authenticated identification. Step 1002 is executed to enable the first serving direct-mode communication apparatus to authenticate with the operating server to obtain a first serving authenticated identification. Accordingly, the user direct-mode communication apparatus and the first serving direct-mode communication apparatus can further exchange information with each other by using the discovery interactive technology and based on the authenticated identifications.

Next, step 1003 is executed to enable the user direct-mode communication apparatus to broadcast a discovery signal based on the user authenticated identification. Step 1004 is executed to enable the first serving direct-mode communication apparatus to receive the discovery signal after the apparatus main communication surface of the user direct-mode communication apparatus is oriented to face towards the first default serving range of the first serving direct-mode communication apparatus. Finally, step 1005 is executed to enable the first serving direct-mode communication apparatus to provide interactive information to the user direct-mode communication apparatus according to the discovery signal and based on the first serving authenticated identification.

According to the above descriptions, the direct-mode communication system and the discovery interactive method thereof of the present invention can enhance the security of direct-mode communication through authentication by a third party and increase the convenience of using the discovery interactive technology in the direct-mode communication system through direct-mode transmission of interactive messages.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A discovery interactive method for use in a direct-mode communication system, the direct-mode communication system comprising a user direct-mode communication apparatus and a first serving direct-mode communication apparatus both connecting to an operating server, the first serving direct-mode communication apparatus further connecting to a second serving direct-mode communication apparatus, the second serving direct-mode communication apparatus having a second serving authenticated identification obtained through authenticating with the operating server, the discovery interactive method comprising the following steps of:
- (a) authenticating, by the user direct-mode communication apparatus, with the operating server to obtain a user authenticated identification;
- (b) authenticating, by the first serving direct-mode communication apparatus, with the operating server to obtain a first serving authenticated identification;
- (c) broadcasting, by the user direct-mode communication apparatus, a discovery signal based on the user authenticated identification, wherein the discovery signal comprises a user identifier of the user direct-mode communication apparatus;
- (d1) determining, by the first serving direct-mode communication apparatus, that the user direct-mode communication apparatus is legal according to the user authenticated identification after the user direct-mode communication apparatus enters a first default serving range of the first serving direct-mode communication apparatus;
- (d2) receiving, by the first serving direct-mode communication apparatus, the discovery signal after step (d1); and
- (e) providing, by the first serving direct-mode communication apparatus, interactive information to the user direct-mode communication apparatus according to the discovery signal and based on the first serving authenticated identification;

wherein the first serving direct-mode communication apparatus forwards the user identifier comprised in the discovery signal to the second serving direct-mode communication apparatus after step (d2) then the second serving direct-mode communication apparatus successively provides the interactive information to the user direct-mode communication apparatus according to the discovery signal comprising the user identifier and based on the second serving authenticated identification after the user direct-mode communication apparatus enters a second default serving range of the second serving direct-mode communication apparatus.

2. The discovery interactive method as claimed in claim 1, wherein the interactive information comprises expenditure information, the discovery interactive method further comprising the following step after the step (e):
- (e1) transmitting, by the first serving direct-mode communication apparatus, the expenditure information to the operating server.

3. The discovery interactive method as claimed in claim 1, wherein the step (a) further comprises the following steps of:
- (a1) transmitting, by the user direct-mode communication apparatus, a user authentication request signal to the operating server; and
- (a2) receiving, by the user direct-mode communication apparatus, the user authenticated identification from the operating server after the step (a1);

wherein the step (b) further comprises the following steps of:
- (b1) transmitting, by the first serving direct-mode communication apparatus, a first serving authentication request signal to the operating server; and
- (b2) receiving, by the first serving direct-mode communication apparatus, the first serving authenticated identification from the operating server after the step (b1).

4. The discovery interactive method as claimed in claim 1, further comprising the following steps after the step (e):
- (e1) determining, by the user direct-mode communication apparatus, that the first serving direct-mode communication apparatus is legal according to the first serving authenticated identification; and
- (e2) receiving, by the user direct-mode communication apparatus, the interactive information after the step (e1).

5. The discovery interactive method as claimed in claim 1, wherein the step (d2) further comprises the following step of:
- (d20) receiving, by the first serving direct-mode communication apparatus, the discovery signal after an apparatus main communication surface of the user direct-mode communication apparatus is oriented to face towards the first default serving range of the first serving direct-mode communication apparatus.

6. A discovery interactive method for use in a direct-mode communication system, the direct-mode communication system comprising a user direct-mode communication apparatus and a first serving direct-mode communication apparatus both connecting to an operating server, the first serving direct-mode communication apparatus further connecting to a second serving direct-mode communication apparatus, the second serving direct-mode communication apparatus having a second serving authenticated identification obtained through authenticating with the operating server, the discovery interactive method comprising the following steps of:
- (a) authenticating, by the user direct-mode communication apparatus, with the operating server to obtain a user authenticated identification;
- (b) authenticating, by the first serving direct-mode communication apparatus, with the operating server to obtain a first serving authenticated identification;
- (c) broadcasting, by the user direct-mode communication apparatus, a discovery signal based on the user authenticated identification, wherein the discovery signal comprises a user identifier of the user direct-mode communication apparatus;
- (d1) determining, by the first serving direct-mode communication apparatus, that the user direct-mode communication apparatus is legal according to the user authenticated identification after the user direct-mode communication apparatus enters a first default serving range of the first serving direct-mode communication apparatus;
- (d2) receiving, by the first serving direct-mode communication apparatus, the discovery signal after step (d1);
- (e) providing, by the first serving direct-mode communication apparatus, interactive information to the user direct-mode communication apparatus according to the discovery signal and based on the first serving authenticated identification;
- (e1) detecting, by the first serving direct-mode communication apparatus, that the user direct-mode communication apparatus enters a second default serving range of the second serving direct-mode communication apparatus; and
- (e2) forwarding, by the first serving direct-mode communication apparatus, the user identifier comprised in the discovery signal to the second serving direct-mode communication apparatus after the step (e1) then the second serving direct-mode communication apparatus successively provides the interactive information to the user direct-mode communication apparatus according to the discovery signal comprising the user identifier and based on the second serving authenticated identification.

7. A discovery interactive method for use in a direct-mode communication system, the direct-mode communication system comprising a user direct-mode communication apparatus and a first serving direct-mode communication apparatus both connecting to an operating server, the first serving direct-mode communication apparatus further connecting to a second serving direct-mode communication apparatus, the second serving direct-mode communication apparatus having a second serving authenticated identification obtained through authenticating with the operating server, the discovery interactive method comprising the following steps of:
  (a) authenticating, by the user direct-mode communication apparatus, with the operating server to obtain a user authenticated identification;
  (b) authenticating, by the first serving direct-mode communication apparatus, with the operating server to obtain a first serving authenticated identification;
  (c) broadcasting, by the user direct-mode communication apparatus, a discovery signal based on the user authenticated identification, wherein the discovery signal comprises a user identifier of the user direct-mode communication apparatus;
  (d1) determining, by the first serving direct-mode communication apparatus, that the user direct-mode communication apparatus is legal according to the user authenticated identification after the user direct-mode communication apparatus enters a first default serving range of the first serving direct-mode communication apparatus;
  (d2) receiving, by the first serving direct-mode communication apparatus, the discovery signal after step (d1);
  (e) providing, by the first serving direct-mode communication apparatus, interactive information to the user direct-mode communication apparatus according to the discovery signal and based on the first serving authenticated identification;
  (e1) receiving, by the first serving direct-mode communication apparatus, an interactive information request message comprising the user identifier from the second serving direct-mode communication apparatus; and
  (e2) transmitting, by the first serving direct-mode communication apparatus, the interactive information corresponding to the user identifier to the second serving direct-mode communication apparatus according to the interactive information request message comprising the user identifier then the second serving direct-mode communication apparatus successively provides the interactive information to the user direct-mode communication apparatus based on the second serving authenticated identification.

8. A discovery interactive method for use in a first serving direct-mode communication apparatus, the first serving direct-mode communication apparatus being used in a direct-mode communication system, the direct-mode communication system further comprising a user direct-mode communication apparatus and an operating server, the first serving direct-mode communication apparatus further connecting to a second serving direct-mode communication apparatus, the second serving direct-mode communication apparatus having a second serving authenticated identification obtained through authenticating with the operating server, and the user direct-mode communication apparatus and the first serving direct-mode communication apparatus connecting to the operating server respectively, the discovery interactive method comprising the steps of:
  (a) authenticating, by the first serving direct-mode communication apparatus, with the operating server to obtain a first serving authenticated identification;
  (b1) determining, by the first serving direct-mode communication apparatus, that the user direct-mode communication apparatus is legal according to a user authenticated identification after the user direct-mode communication apparatus enters a first default serving range of the first serving direct-mode communication apparatus, wherein the user authenticated identification is obtained by the user direct-mode communication apparatus through authenticating with the operating server;
  (b2) receiving, by the first serving direct-mode communication apparatus, a discovery signal, which comprises a user identifier of the user direct-mode communication apparatus and is broadcasted by the user direct-mode communication apparatus based on the user authenticated identification, after step (b1); and
  (c) providing, by the first serving direct-mode communication apparatus, interactive information to the user direct-mode communication apparatus according to the discovery signal and based on the first serving authenticated identification;
  wherein the first serving direct-mode communication apparatus forwards the user identifier comprised in the discovery signal to the second serving direct-mode communication apparatus after step (b2) then the second serving direct-mode communication apparatus successively provides the interactive information to the user direct-mode communication apparatus according to the discovery signal comprising the user identifier and based on the second serving authenticated identification after the user direct-mode communication apparatus enters a second default serving range of the second serving direct-mode communication apparatus.

9. The discovery interactive method as claimed in claim 8, wherein the interactive information comprises expenditure information, the discovery interactive method further comprising the following step after the step (c):
  (c1) transmitting, by the first serving direct-mode communication apparatus, the expenditure information to the operating server.

10. The discovery interactive method as claimed in claim 8, wherein the step (a) further comprises the steps of:
  (a1) transmitting, by the first serving direct-mode communication apparatus, a first serving authentication request signal to the operating server; and
  (a2) receiving, by the first serving direct-mode communication apparatus, the first serving authenticated identification from the operating server after the step (a1).

11. The discovery interactive method as claimed in claim 8, wherein the step (b2) further comprises the step of:
  (b20) receiving, by the first serving direct-mode communication apparatus, the discovery signal after an apparatus main communication surface of the user direct-mode communication apparatus is oriented to face towards the first default serving range of the first serving direct-mode communication apparatus.

12. A discovery interactive method for use in a first serving direct-mode communication apparatus, the first serving direct-mode communication apparatus being used in a direct-mode communication system, the direct-mode communication system further comprising a user direct-mode communication apparatus and an operating server, the first serving direct-mode communication apparatus further connecting to a second serving direct-mode communication apparatus, the second serving direct-mode communication apparatus having a second serving authenticated identification obtained through authenticating with the operating server, and the user direct-mode communication apparatus and the first serving direct-mode communication apparatus connecting to the operating server respectively, the discovery interactive method comprising the steps of:

(a) authenticating, by the first serving direct-mode communication apparatus, with the operating server to obtain a first serving authenticated identification;

(b1) determining, by the first serving direct-mode communication apparatus, that the user direct-mode communication apparatus is legal according to a user authenticated identification after the user direct-mode communication apparatus enters a first default serving range of the first serving direct-mode communication apparatus, wherein the user authenticated identification is obtained by the user direct-mode communication apparatus through authenticating with the operating server;

(b2) receiving, by the first serving direct-mode communication apparatus, a discovery signal, which comprises a user identifier of the user direct-mode communication apparatus and is broadcasted by the user direct-mode communication apparatus based on the user authenticated identification, after step (b1);

(c) providing, by the first serving direct-mode communication apparatus, interactive information to the user direct-mode communication apparatus according to the discovery signal and based on the first serving authenticated identification;

(c1) detecting, by the first serving direct-mode communication apparatus, that the user direct-mode communication apparatus enters a second default serving range of the second serving direct-mode communication apparatus; and (c2) forwarding, by the first serving direct-mode communication apparatus, the user identifier comprised in the discovery signal to the second serving direct-mode communication apparatus after the step (c1) then the second serving direct-mode communication apparatus successively provides the interactive information to the user direct-mode communication apparatus according to the discovery signal comprising the user identifier and based on the second serving authenticated identification.

13. A discovery interactive method for use in a first serving direct-mode communication apparatus, the first serving direct-mode communication apparatus being used in a direct-mode communication system, the direct-mode communication system further comprising a user direct-mode communication apparatus and an operating server, the first serving direct-mode communication apparatus further connecting to a second serving direct-mode communication apparatus, the second serving direct-mode communication apparatus having a second serving authenticated identification obtained through authenticating with the operating server, and the user direct-mode communication apparatus and the first serving direct-mode communication apparatus connecting to the operating server respectively, the discovery interactive method comprising the steps of:

(a) authenticating, by the first serving direct-mode communication apparatus, with the operating server to obtain a first serving authenticated identification;

(b1) determining, by the first serving direct-mode communication apparatus, that the user direct-mode communication apparatus is legal according to a user authenticated identification after the user direct-mode communication apparatus enters a first default serving range of the first serving direct-mode communication apparatus, wherein the user authenticated identification is obtained by the user direct-mode communication apparatus through authenticating with the operating server;

(b2) receiving, by the first serving direct-mode communication apparatus, a discovery signal, which comprises a user identifier of the user direct-mode communication apparatus and is broadcasted by the user direct-mode communication apparatus based on the user authenticated identification, after step (b1);

(c) providing, by the first serving direct-mode communication apparatus, interactive information to the user direct-mode communication apparatus according to the discovery signal and based on the first serving authenticated identification;

(c1) receiving, by the first serving direct-mode communication apparatus, the interactive information request message comprising the user identifier from the second serving direct-mode communication apparatus; and (c2) transmitting, by the first serving direct-mode communication apparatus, the interactive information corresponding to the user identifier to the second serving direct-mode communication apparatus according to the interactive information request message comprising the user identifier then the second serving direct-mode communication apparatus successively provides the interactive information to the user direct-mode communication apparatus based on the second serving authenticated identification.

14. A direct-mode communication system, comprising:

a user direct-mode communication apparatus, connecting to an operating server and being configured to authenticate with the operating server to obtain a user authenticated identification; and a first serving direct-mode communication apparatus, connecting to the operating server and being configured to authenticate with the operating server to obtain a first serving authenticated identification, wherein the first serving direct-mode communication apparatus further connects to a second serving direct-mode communication apparatus, and the second serving direct-mode communication apparatus has a second serving authenticated identification obtained through authenticating with the operating server;

wherein the user direct-mode communication apparatus broadcasts a discovery signal, which comprises a user identifier of the user direct-mode communication apparatus, based on the user authenticated identification; and the first serving direct-mode communication apparatus:
   determines that the user direct-mode communication apparatus is legal according to the user authenticated identification after the user direct-mode communication apparatus enters a first default serving range of the first serving direct-mode communication apparatus,
   receives the discovery signal after the user direct-mode communication apparatus enters the first default serving range of the first serving direct-mode communication apparatus; and
   provides interactive information to the user direct-mode communication apparatus according to the discovery signal and based on the first serving authenticated identification,
   wherein the first serving direct-mode communication apparatus further forwards the user identifier comprised in the discovery signal to the second serving direct-mode communication apparatus then the second serving direct-mode communication apparatus successively provides the interactive information to the user direct-mode communication apparatus according to the discovery signal comprising the user identifier and based on the second serving authenticated identification after the user direct-mode communication apparatus enters a second default serving range of the second serving direct-mode communication apparatus.

15. The direct-mode communication system as claimed in claim 14, wherein the interactive information comprises expenditure information, and the first serving direct-mode communication apparatus further transmits the expenditure information to the operating server.

16. The direct-mode communication system as claimed in claim 14, wherein the user direct-mode communication apparatus further transmits a user authentication request signal to the operating server, and receives the user authenticated identification from the operating server; and the first serving direct-mode communication apparatus further transmits a first serving authentication request signal to the operating server, and receives the first serving authenticated identification from the operating server.

17. The direct-mode communication system as claimed in claim 14, wherein the user direct-mode communication apparatus further determines that the first serving direct-mode communication apparatus is legal according to the first serving authenticated identification, and receives the interactive information.

18. The direct-mode communication system as claimed in claim 14, wherein the first serving direct-mode communication apparatus further receives the discovery signal after an apparatus main communication surface of the user direct-mode communication apparatus is oriented to face towards the first default serving range of the first serving direct-mode communication apparatus.

19. A direct-mode communication system, comprising:
a user direct-mode communication apparatus, connecting to an operating server and being configured to authenticate with the operating server to obtain a user authenticated identification; and
a first serving direct-mode communication apparatus, connecting to the operating server and being configured to authenticate with the operating server to obtain a first serving authenticated identification, wherein the first serving direct-mode communication apparatus further connects to a second serving direct-mode communication apparatus, and the second serving direct-mode communication apparatus has a second serving authenticated identification obtained through authenticating with the operating server;
wherein the user direct-mode communication apparatus broadcasts a discovery signal, which comprises a user identifier of the user direct-mode communication apparatus, based on the user authenticated identification; and
the first serving direct-mode communication apparatus:
determines that the user direct-mode communication apparatus is legal according to the user authenticated identification after the user direct-mode communication apparatus enters a first default serving range of the first serving direct-mode communication apparatus;
receives the discovery signal after the user direct-mode communication apparatus enters the first default serving range of the first serving direct-mode communication apparatus;
provides interactive information to the user direct-mode communication apparatus according to the discovery signal and based on the first serving authenticated identification;
detects that the user direct-mode communication apparatus enters a second default serving range of the second serving direct-mode communication apparatus; and
forwards the user identifier comprised in the discovery signal to the second serving direct-mode communication apparatus then the second serving direct-mode communication apparatus successively provides the interactive information to the user direct-mode communication apparatus according to the discovery signal comprising the user identifier and based on the second serving authenticated identification.

20. A direct-mode communication system, comprising:
a user direct-mode communication apparatus, connecting to an operating server and being configured to authenticate with the operating server to obtain a user authenticated identification; and
a first serving direct-mode communication apparatus, connecting to the operating server and being configured to authenticate with the operating server to obtain a first serving authenticated identification, wherein the first serving direct-mode communication apparatus further connects to a second serving direct-mode communication apparatus, and the second serving direct-mode communication apparatus has a second serving authenticated identification obtained through authenticating with the operating server;
wherein the user direct-mode communication apparatus broadcasts a discovery signal, which comprises a user identifier of the user direct-mode communication apparatus, based on the user authenticated identification; and
the first serving direct-mode communication apparatus:
determines that the user direct-mode communication apparatus is legal according to the user authenticated identification after the user direct-mode communication apparatus enters a first default serving range of the first serving direct-mode communication apparatus;
receives the discovery signal after the user direct-mode communication apparatus enters the first default serving range of the first serving direct-mode communication apparatus;
provides interactive information to the user direct-mode communication apparatus according to the discovery signal and based on the first serving authenticated identification;
receives an interactive information request message comprising the user identifier from the second serving direct-mode communication apparatus; and
transmits the interactive information corresponding to the user identifier to the second serving direct-mode communication apparatus according to the interactive information request message comprising the user identifier then the second serving direct-mode communication apparatus successively provides the interactive information to the user direct-mode communication apparatus based on the second serving authenticated identification.

21. A first serving direct-mode communication apparatus for use in a direct-mode communication system, the direct-mode communication system further comprising a user direct-mode communication apparatus, the user direct-mode communication apparatus and the first serving direct-mode communication apparatus connecting to an operating server respectively, the first serving direct-mode communication apparatus further connecting to a second serving direct-mode communication apparatus, and the second serving direct-mode communication apparatus having a second serving authenticated identification obtained through authenticating with the operating server, the first serving direct-mode communication apparatus comprising:
a processor; and
a transceiver;
wherein the processor is configured to:
authenticate with the operating server via the transceiver to obtain a first serving authenticated identification;
determine that the user direct-mode communication apparatus is legal according to a user authenticated identification, which is obtained by the user direct-mode communication apparatus through authenticating with the operating server, after the user direct-mode communication apparatus enters a first default serving range of the first serving direct-mode communication apparatus;
receive a discovery signal, which comprises a user identifier of the user direct-mode communication apparatus and is broadcasted by the user direct-mode communication apparatus based on a user authenticated identification, via the transceiver after the user direct-mode communication apparatus enters the first default serving range of the first serving direct-mode communication apparatus; and
provide interactive information to the user direct-mode communication apparatus via the transceiver according to the discovery signal and based on the first serving authenticated identification;
wherein the processor is further configured to forward the user identifier comprised in the discovery signal to the second serving direct-mode communication apparatus via the transceiver then the second serving direct-mode communication apparatus successively provides the interactive information to the user direct-mode communication apparatus according to the discovery signal comprising the user identifier and based on the second serving authenticated identification after the user direct-mode communication apparatus enters a second default serving range of the second serving direct-mode communication apparatus.

22. The first serving direct-mode communication apparatus as claimed in claim 21, wherein the interactive information comprises expenditure information, and the processor is further configured to transmit the expenditure information to the operating server via the transceiver.

23. The first serving direct-mode communication apparatus as claimed in claim 21, wherein the processor is further configured to transmit a first serving authentication request signal to the operating server via the transceiver, and receive the first serving authenticated identification from the operating server.

24. The first serving direct-mode communication apparatus as claimed in claim 21, wherein the processor is further configured to receive the discovery signal via the transceiver after an apparatus main communication surface of the user direct-mode communication apparatus is oriented to face towards the first default serving range of the first serving direct-mode communication apparatus.

25. A first serving direct-mode communication apparatus for use in a direct-mode communication system, the direct-mode communication system further comprising a user direct-mode communication apparatus, the user direct-mode communication apparatus and the first serving direct-mode communication apparatus connecting to an operating server respectively, the first serving direct-mode communication apparatus further connecting to a second serving direct-mode communication apparatus, and the second serving direct-mode communication apparatus having a second serving authenticated identification obtained through authenticating with the operating server, the first serving direct-mode communication apparatus comprising:
a processor; and
a transceiver;
wherein the processor is configured to:
authenticate with the operating server via the transceiver to obtain a first serving authenticated identification;
determine that the user direct-mode communication apparatus is legal according to a user authenticated identification, which is obtained by the user direct-mode communication apparatus through authenticating with the operating server, after the user direct-mode communication apparatus enters a first default serving range of the first serving direct-mode communication apparatus;
receive a discovery signal, which comprises a user identifier of the user direct-mode communication apparatus and is broadcasted by the user direct-mode communication apparatus based on a user authenticated identification, via the transceiver after the user direct-mode communication apparatus enters the first default serving range of the first serving direct-mode communication apparatus;
provide interactive information to the user direct-mode communication apparatus via the transceiver according to the discovery signal and based on the first serving authenticated identification;
detect via the transceiver that the user direct-mode communication apparatus enters a second default serving range of the second serving direct-mode communication apparatus; and
forward the user identifier comprised in the discovery signal to the second serving direct-mode communication apparatus via the transceiver then the second serving direct-mode communication apparatus successively provides the interactive information to the user direct-mode communication apparatus according to the discovery signal comprising the user identifier and based on the second serving authenticated identification.

26. A first serving direct-mode communication apparatus for use in a direct-mode communication system, the direct-mode communication system further comprising a user direct-mode communication apparatus, the user direct-mode communication apparatus and the first serving direct-mode communication apparatus connecting to an operating server respectively, the first serving direct-mode communication apparatus further connecting to a second serving direct-mode communication apparatus, and the second serving direct-mode communication apparatus having a second serving authenticated identification obtained through authenticating with the operating server, the first serving direct-mode communication apparatus comprising:
a processor; and
a transceiver;
wherein the processor is configured to:
authenticate with the operating server via the transceiver to obtain a first serving authenticated identification;

determine that the user direct-mode communication apparatus is legal according to a user authenticated identification, which is obtained by the user direct-mode communication apparatus through authenticating with the operating server, after the user direct-mode communication apparatus enters a first default serving range of the first serving direct-mode communication apparatus;

receive a discovery signal, which comprises a user identifier of the user direct-mode communication apparatus and is broadcasted by the user direct-mode communication apparatus based on a user authenticated identification, via the transceiver after the user direct-mode communication apparatus enters the first default serving range of the first serving direct-mode communication apparatus;

provide interactive information to the user direct-mode communication apparatus via the transceiver according to the discovery signal and based on the first serving authenticated identification;

receive an interactive information request message comprising the user identifier from the second serving direct-mode communication apparatus via the transceiver; and transmit via the transceiver the interactive information corresponding to the user identifier to the second serving direct-mode communication apparatus according to the interactive information request message comprising the user identifier then the second serving direct-mode communication apparatus successively provides the interactive information to the user direct-mode communication apparatus based on the second serving authenticated identification.

\* \* \* \* \*